United States Patent [19]

Blincow et al.

[11] Patent Number: 4,727,251
[45] Date of Patent: Feb. 23, 1988

[54] DETECTOR FOR HELICOPTER BLADE CRACK INDICATOR

[75] Inventors: Donald W. Blincow, Rancho Cucamonga; John J. Mahoney, San Bernardino; Jerold H. McCormick, Montclair, all of Calif.

[73] Assignee: General Nucleonics, Inc., Pomona, Calif.

[21] Appl. No.: 832,354

[22] Filed: Feb. 24, 1986

[51] Int. Cl.$^4$ .......................... G01T 1/18; B64C 11/24
[52] U.S. Cl. .................................. 250/308; 250/358.1; 250/374; 416/61
[58] Field of Search ...................... 250/308, 374, 515.1, 250/358.1; 416/61

[56] References Cited

U.S. PATENT DOCUMENTS

| | | | |
|---|---|---|---|
| 3,896,446 | 7/1975 | Kondoh et al. | 416/61 |
| 3,985,318 | 10/1976 | Dominey et al. | 250/303 |
| 4,010,708 | 3/1977 | Keledy et al. | 250/358.1 |
| 4,106,332 | 8/1978 | McKeown | 73/104 |
| 4,448,374 | 5/1984 | Duncan | 313/345 H |
| 4,596,932 | 6/1986 | Buffa et al. | 250/374 |

FOREIGN PATENT DOCUMENTS 111183 6/1984 European Pat. Off. ......... 250/515.1

OTHER PUBLICATIONS

Shapiro et al, "A Proportional Chamber Front End Amplifier and Pulse Shaping Circuit", IEEE Trans. Nucl. Sci., vol. 25, Feb. 1976, pp. 264-267.

Primary Examiner—Carolyn E. Fields
Attorney, Agent, or Firm—Harris, Kern, Wallen & Tinsley

[57] ABSTRACT

A system for indicating cracks in a hollow aircraft blade, such as a helicopter blade. A system wherein a pressure differential is maintained within the blade with respect to the ambient atmosphere and including a pressure sensor for mounting on the blade in communication with the interior of the blade and having a member which moves in response to pressure changes within the blade, a beta radiation source mounted on the member and disposed for radiation transmission to a detector, a beta radiation detector for mounting on a nonrotating portion of the aircraft for receiving radiation from the source, and circuitry having the output of the detector as an input and providing an output which varies as a function of the position of the pressure sensor member for indicating the pressure condition within the blade. An improved beta radiation detector housing which substantially eliminates detector sensitivity to radar transmissions while maintaining sensitivity to nuclear radiation in the beta range.

7 Claims, 5 Drawing Figures

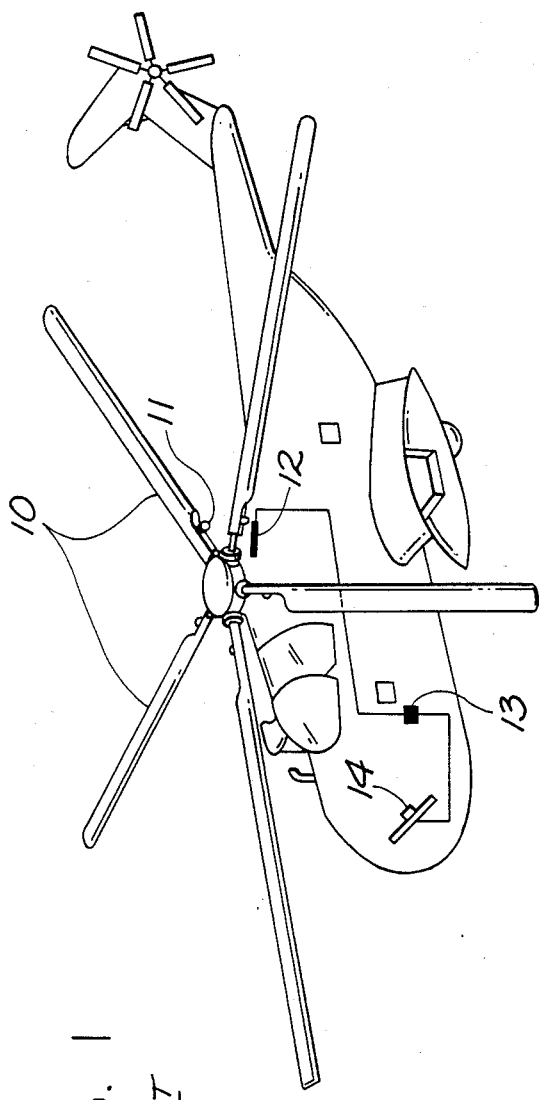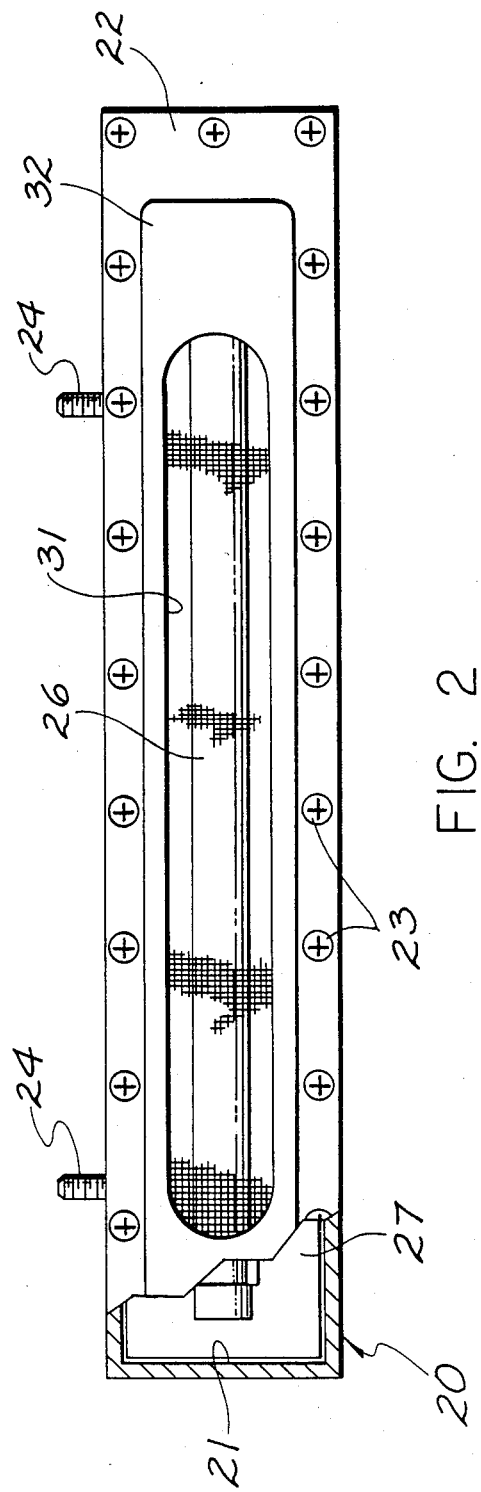

DETECTOR FOR HELICOPTER BLADE CRACK INDICATOR

BACKGROUND OF THE INVENTION

This invention relates to aircraft blades, and in particular, to an improvement in an apparatus for continuously detecting cracks in propeller and helicopter rotor blades.

Aircraft blades are subjected to severe stress and occasionally develop minute cracks. It is of critical importance that a crack in the blade be detected at an early time so that the blade may be replaced preventing an inflight accident. A wide variety of methods are available for detecting cracks, including the making of x-ray pictures, magnetic flux techniques, and detection of pressure changes within a sealed hollow blade.

A method and apparatus utilizing a blade pressure sensor is disclosed in U.S. Pat. No. 3,985,318, and the present invention is an improvement on that system.

The prior art system is illustrated in FIG. 1 which shows a conventional helicopter with a plurality of rotor blades 10. A pressure sensor 11 with a beta radiation source is mounted in each of the blades. A beta radiation detector 12 is mounted on a fixed portion of the aircraft adjacent the rotating blades. The system also includes a signal processor 13 containing electronic circuitry, and a warning indicator 14 for mounting on the instrument panel of the aircraft.

The typical pressure sensor 11 includes a member which moves as a function of the pressure within the blade on which the sensor is mounted. A beta radiation source is carried on the moving member and a radiation shield or window is provided in the sensor so that radiation from the source is blocked when the pressure on the blade is in an acceptable range, and radiation passes the shield or window when the pressure is in an unacceptable range, thereby indicating leakage through a crack in the blade. This prior art system is described in greater detail in the aforesaid U.S. Pat. No. 3,985,318. The present invention is directed to a new and improved housing for the beta radiation detector.

The radiation detector is mounted on the aircraft in a position for receiving radiation from a sensor. However, modern day aircraft are exposed to many types of radiation including electromagnetic radiation in the microwave range produced by high power radar systems and the like. These extraneous radiation sources can adversely affect the operation the crack detection system when received by the radiation detector. The present invention provides a new and improved beta radiation detector housing which substantially eliminates detector sensitivity to radar transmissions and other transmissions in the electromagnetic region, while maintaining detector sensitivity to nuclear beta radiation.

SUMMARY OF THE INVENTION

A beta radiation detector housing for an aircraft blade crack detection system having a pressure sensor, a beta radiation source mounted on a moving member of the pressure sensor, a radiation detector, and circuitry having the output of the detector as input and providing an output varying as a function of position of the moving member of the sensor, for indicating the pressure condition within the blade. The new beta radiation housing includes an enclosure of an electrical conducting material and having an open side, means for supporting the beta radiation detector therein, a cover for the open side and having a window for passage of electromagnetic and beta radiation, an electrical conducting apertured sheet, and means for attaching the cover to the enclosure with the sheet therebetween.

In the preferred embodiment, the electrical conducting sheet is a metal wire screen and is carried in a gasket sandwich having a first layer of metal foil with a window therein, a second layer comprising the screen, and a third layer of metal foil with a window therein. Preferably there is a fourth layer of a compressive sealant material for improved sealing of the housing.

The preferred embodiment also includes an RF filter compartment within the enclosure which compartment has electrical conducting walls with openings for a connector which provides electrical circuit connections between the exterior of the enclosure and the compartment and for electromagnetic interference filters which provide circuit connections between the compartment and the interior of the enclosure. Preferably electromagnetic interference filters are mounted inside the compartment.

BRIEF DESCRIPTION OF THE DRAWINGS

FIG. 1 illustrates a helicopter with the prior art blade crack indicator system installed therein;

FIG. 2 is a top view of a beta radiation detector housing for use in the system of FIG. 1, and incorporating the presently preferred embodiment of the invention;

DESCRIPTION OF THE PREFERRED EMBODIMENT

Figure 3:
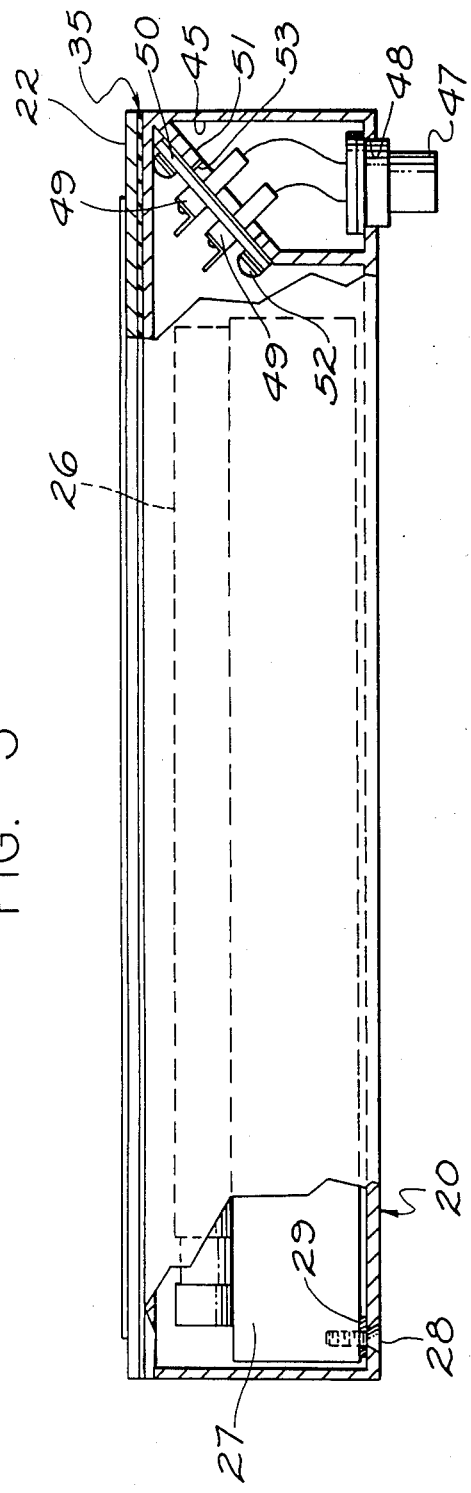
FIG. 3 is a side view of the housing of FIG. 2, shown partly in section.

The housing of FIGS. 2 and 3 includes an enclosure 20 of electrical conducting material, typically steel or aluminum. The housing has an open side 21 which is closed by a cover 22 attached by a plurality of screws 23. Studs 24 may be provided on another side of the enclosure for mounting purposes.

A beta radiation detector 26, typically a Geiger-Mueller tube, is carried within the enclosure, typically being mounted on an electronics package 27 which preferably is encased or potted in the conventional manner. The electronics package 27 is attached to the bottom side of the enclosure 20 by screws 28 with spacer washers 29.

The cover 22 typically is a metal plate and has a window 31 which provides a radiation path to the detector 26. Preferably the window 31 is covered by another plate 32 which produces little or no attenuation of radiation in the microwave and beta ranges. Typically the plate 32 is sheet of plastic such as epoxy glass, which is cemented to the cover 22.

Figure 4:
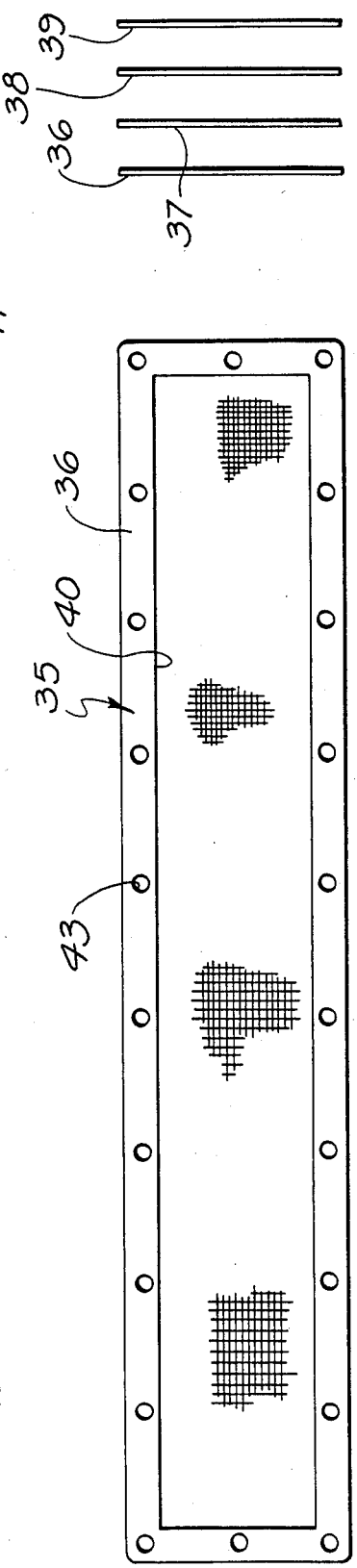
FIG. 4 is a top view of a gasket for the housing of FIGS. 2 and 3, and incorporating the presently preferred embodiment of the invention.
Figure 5:
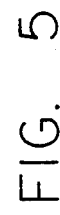
FIG. 5 is an exploded end view of the gasket of FIG. 4.

A gasket 35 is inserted between the cover and the enclosure, and the presently preferred embodiment of the gasket is shown in FIGS. 4 and 5. The gasket 35 preferably is a sandwich comprising layers 36, 37, 38 and 39. The layers 36 and 38 preferably are a metal foil with a window 40 therein. The layer 37 is an electrical conducting sheet with apertures therethrough, typically a woven metal wire screen. The layer 39 is of a compressive conductive sealant material, typically referred to as EM1 gasket material, with a window therein. The windows in the layers 36, 38 and 39 are aligned with the window 31 in the cover 22 so as to provide direct line of sight from the exterior of the housing to the tube 26. Openings 43 are provided in all layers of the gasket sandwich for the cover mounting screws 23.

An RF filter compartment 45 is provided within the enclosure 20. The walls of the compartment 45 are formed of electrical conducting material and typically of the same material as the enclosure 20, with the compartment being formed by welding or casting. A conventional electrical cable connector 47 is mounted in an opening 48 of the compartment 45, and provides electrical circuit paths between the exterior of the housing and the interior of the compartment. A plurality of insulated feed through type electromagnetic interference filters 49 are mounted on a plate 50 which in turn is attached to a wall 51 of the compartment 45 by screws 52, with the filters 49 passing through another opening 53 in the compartment 45. The filters 49 provide electrical circuit paths between the interior of the compartment 45 and the electronics unit 27 in the interior of the enclosure 20.

With the RF filter compartment 45, the exterior electrical connections from the signal processor 13 are connected to the electronics package 27 through the compartment 45 and the filters 49, rather than being directly connected by a single connector as in the prior systems.

The electrical conducting apertured sheet or screen is selected to have openings of a size which will not pass electromagnetic radiation in the microwave range. Typically each opening should have a width not greater than about 0.050 inches. At the same time, the sheet or screen with openings of this size readily passes beta particles. In operation, the beta particles from the source in the sensor are readily passed through the detector housing to the tube 26 when the sensor has its source exposed by the moving member and the blade carrying the sensor passes over the detector. However, electromagnetic radiation from radars and others sources in the vicinity of the aircraft is blocked from the detector 26 by being electrically grounded at the sheet 37.

Another source of disturbance to the detector is electromagnetic interference transmitted via wire cable connections to the electronics in the housing. By utilizing the enclosed RF filter compartment which isolates the external electrical cable from the interior of the enclosure, along with the electromagnetic interference filters within the compartment, this type of disturbance is eliminated or greatly reduced.

We claim:

1. An improved beta radiation detector housing for a system for indicating cracks in a hollow aircraft blade wherein a pressure differential is maintained within the blade with respect to the ambient atmosphere and for operation in the presence of strong electromagnetic fields and beta radiation, the system including
    a pressure sensor means for mounting on the blade in communication with the interior of the blade and having a member moveable between a first position for a higher pressure differential and a second position for a lower pressure differential,
    a beta radiation source mounted on the member with the beta radiation source disposed for radiation transmission to a detector when the member is in the second position,
    a beta radiation detector means for mounting on a nonrotating portion of the aircraft in a position to receive beta radiation from the beta radiation source and electromagnetic radiation from other sources, and
    circuit means having the output of the detector means as an input and providing an output varying as a function of the position of the member for indicating the pressure condition within the blade,
    said housing comprising:
    an enclosure of an electrical conducting material and having an open side and means for supporting the beta radiation detector means therein and exposed to radiation passing through said open side;
    a cover for said open side, said cover having a window for passage of electromagnetic and beta radiation;
    an electrical conducting sheet means having apertures therethrough, with said sheet means providing for blocking electromagnetic radiation for protecting said detector means from electromagnetic radiation while said sheet means at the same time provides for passing beta radiation particles permitting detection of beta radiation; and
    means for attaching said cover to said enclosure with said sheet means therebetween.

2. A radiation detector housing as defined in claim 1 wherein said electrical conducting sheet means is carried in a gasket having a sandwich of
    a first layer of metal foil with a window therein,
    a second layer comprising said electrical conducting sheet means, and
    a third layer of metal foil with a window therein,
    with said first and third layer windows aligned with said cover window.

3. A radiation detector housing as defined in claim 2 wherein said sandwich includes a fourth layer of a compressive sealant material with a window aligned with said cover window.

4. A radiation detector housing as defined in claim 2 wherein said electrical conducting sheet means is a metal wire screen.

5. A radiation detector housing as defined in claim 4 including:
    a RF filter compartment within said enclosure, said compartment having electrical conducting walls with first and second openings;
    connector means mounted in said first opening for providing electrical circuit connections between the exterior of said enclosure and the interior of said compartment; and
    electromagnetic interference filter means mounted within said second opening for providing electrical circuit connections between the interior of said compartment and the interior of said enclosure.

6. A radiation detector housing as defined in claim 1 wherein said electrical conducting sheet means is a metal wire screen.

7. A radiation detector housing as defined in claim 1 including:
    a RF filter compartment within said enclosure, said compartment having electrical conducting walls with first and second openings;
    connector means mounted in said first opening for providing electrical circuit connections between the exterior of said enclosure and the interior of said compartment; and
    electromagnetic interference filter means mounted within said second opening for providing electrical circuit connections between the interior of said compartment and the interior of said enclosure.

* * * * *